UNITED STATES PATENT OFFICE.

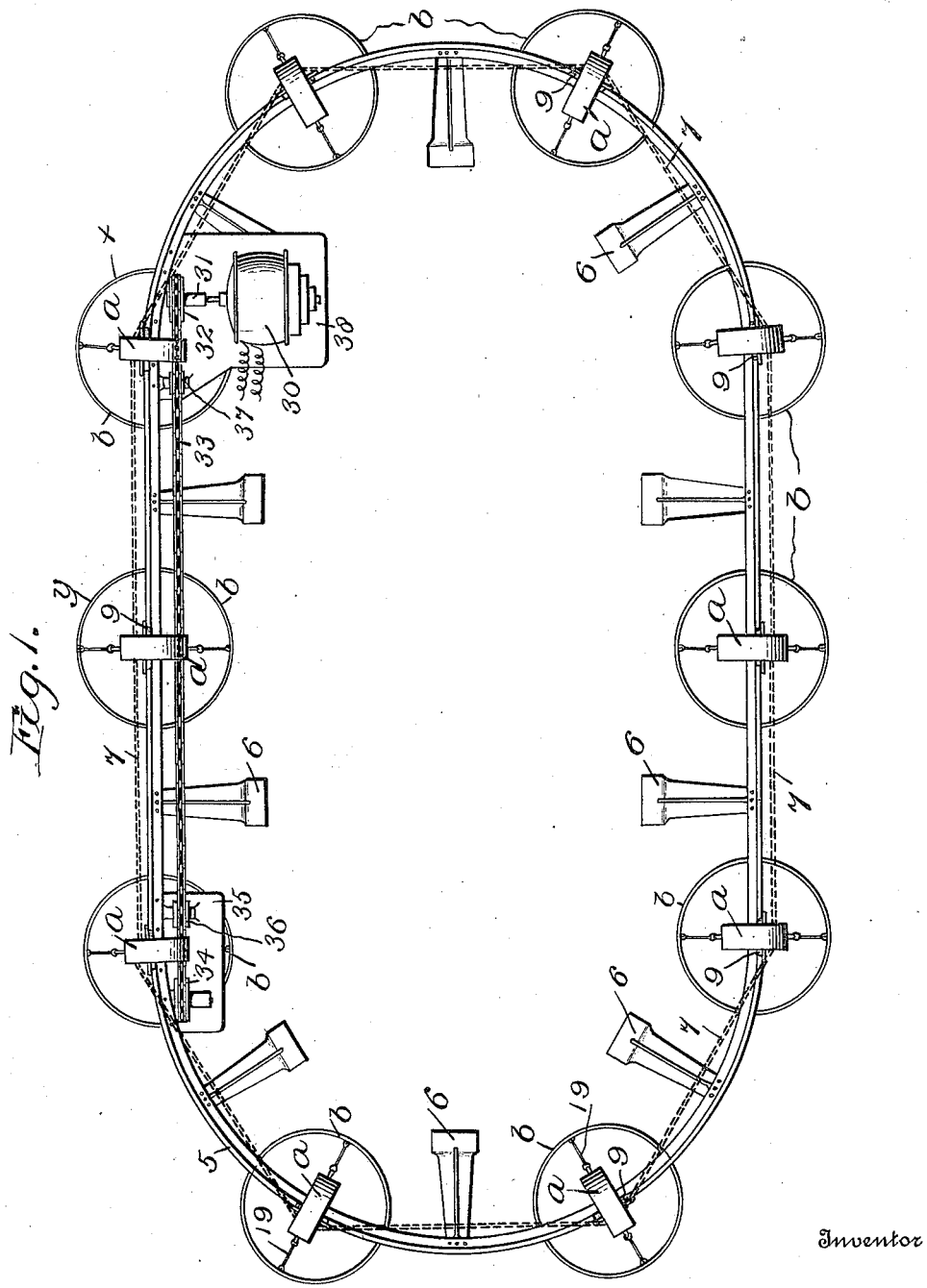

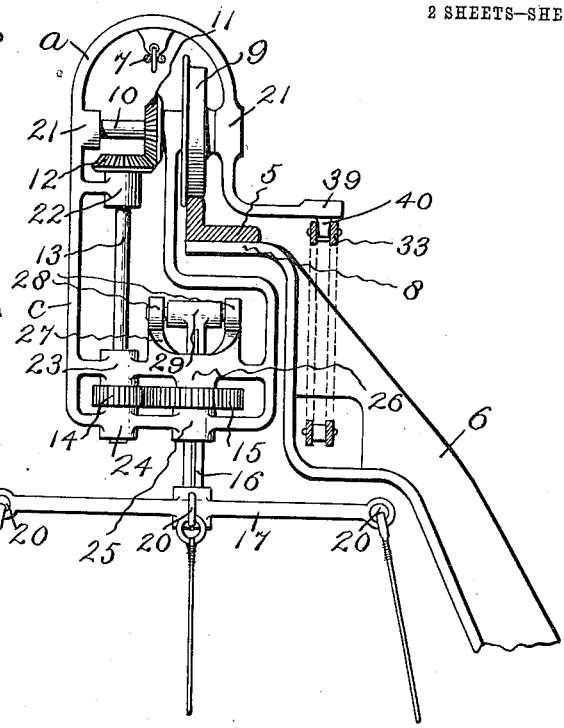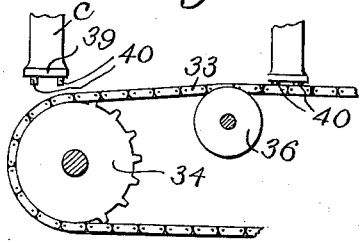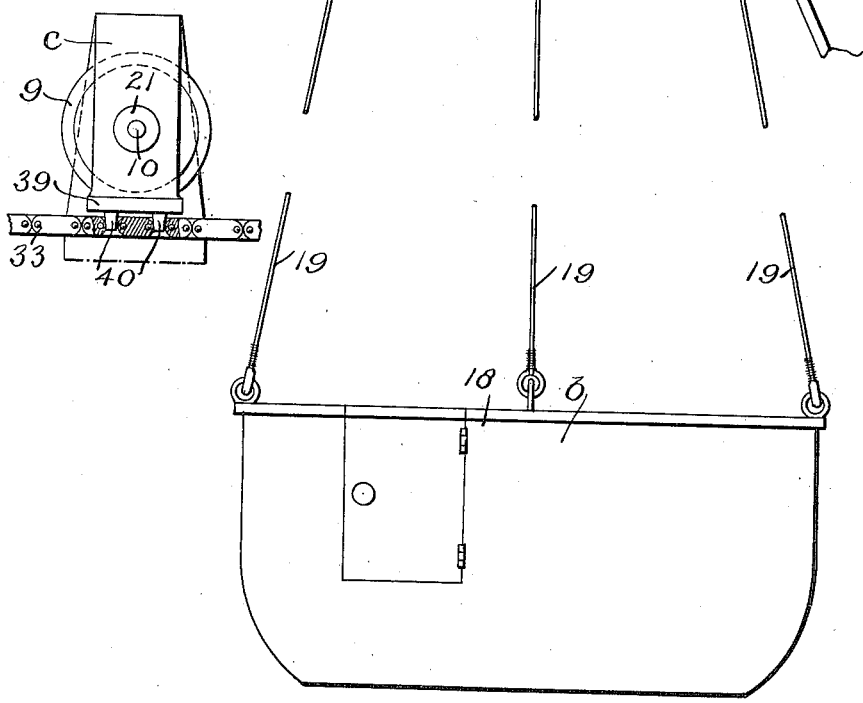

HENRY J. MULLER, OF BROOKLYN, NEW YORK.

AMUSEMENT-RAILWAY.

1,092,740. Specification of Letters Patent. Patented Apr. 7, 1914.

Application filed June 25, 1913. Serial No. 775,790.

*To all whom it may concern:*

Be it known that I, HENRY J. MULLER, a citizen of the United States, residing at Brooklyn, in the county of Kings and State of New York, have invented new and useful Improvements in Amusement-Railways, of which the following is a specification.

The general object of the invention is to improve the construction of amusement railways in point of car propelling properties. And to this end the invention resides in providing means adapted for carrying a car and imparting thereto a compound rotary and reciprocating movement as the car progresses over the railroad.

Other objects will appear and be better understood from that embodiment of my invention of which the following is a specification, reference being had to the accompanying drawings forming part hereof, in which:—

Figure 1 is a plan of the invention. Fig. 2 is a detail vertical cross section showing the truck and car in side elevation. Fig. 3 is a sectional detail of a portion of the mechanism for propelling the cars. Fig. 4 is a view similar to Fig. 3 but showing the upper part of the truck in side elevation.

In the embodiment of the device shown an endless track 5 is supported for a suitable distance above the ground by a series of uprights 6 and arranged to move on the track 5 are a series of trucks $a$, which carry the cars $b$. These latter are supported above the ground and access is had to them from a platform (not shown). The trucks are connected by flexible elements as chains 7, which operate to hold the said trucks and cars in spaced relation to each other and also to bind them together, whereby, to have the whole series of cars and trucks move when driving force is applied to any truck.

The upper ends of the uprights 6 have inwardly directed lateral extensions, one of which is shown in Fig. 2 and indicated by 8. These extensions by their presence, serve as offsets and supports for the track rail 5. Each truck is provided with a traction wheel 9 fast on an axle 10 which axle also has secured to it a bevel gear wheel 11 which meshes with a bevel gear 12 at one end of a shaft 13. A pinion 14 adjacent to the other end of the shaft 13 meshes with a gear wheel 15 which is splined on a vertical shaft 16 that carries at its lower end a spider or bracket 17. The car $b$ comprises a body 18 and flexible hangers 19 which are connected at their upper ends to the eyes 20 in the spider or bracket 17.

The parts 9 to 16 inclusive, are carried directly by the truck $a$ and they are so disposed that the center of gravity of the car and truck when the parts are positioned as shown in Fig. 2, will pass vertically through the tread of the rail 5. The arrangement of the parts to have the center of gravity so positioned, is brought about by having the wheel 9 and shaft 16 in vertical alinement, the offsetting of the part 8 lends to this arrangement, as shown in Fig. 2.

The frame $c$ of the truck $a$ has bearings 21—21 for the axle 10 and bearings 22—23 and 24 for the axle 13. The bearings 23 and 24 are situated relatively close to each other and receive between them the pinion 14. Bearings 25 and 26 are provided for the shaft 16 and adapted for permitting therein vertical or longitudinal movement of said shaft, said bearings also being arranged in spaced relation and receiving between them the crown gear wheel 15. The frame $c$ is also formed with a cam surface 27 which surrounds the bearing 26 and which forms a tread plate for a pair of rolls 28—28 at the opposite ends of an axle mounted in a sleeve 29 arranged horizontally at the upper end of the shaft 16. The mechanism for operating the cars and trucks is herein shown to consist of a motor 30 whose armature shaft 31 is provided at one end with a sprocket wheel 32. The sprocket chain 33 connects the wheel 32 with a sprocket wheel 34 which sprocket wheel is suitably supported on a platform 35 and positioned slightly below the plane of the sprocket wheel 32. An idler 36 is arranged on the support 35 and adjacent to the sprocket wheel 34 and positioned with its periphery in alinement with that of a similar idler 37 on the platform 38 which supports the motor 30, whereby to have the upper part of the chain between said idlers horizontal or substantially so, while the portion of the chain between the idlers and adjacent sprockets incline downwardly as shown in detail in Fig. 3.

As shown in Fig. 2, the frame $c$ has an inwardly directed lateral extension 39 formed with a depending tooth or teeth 40 arranged so as to gradually interlock with the sprocket chain 33.

Now with the parts positioned as shown in Fig. 1 it is obvious that upon starting the motor the chain 33 will move and carry with it the cars on the left of said figure. Now these cars by virtue of their connection with the other cars in the series, will cause these latter cars to follow. Assuming the cars on the left to be moving toward the observer in Fig. 1, the first of these cars upon passing beyond the idler 36, will disengage from the chain 33, this engagement being effected by the construction previously described and as shown in Fig. 3. Here it will be observed that the portion of the chain between the idler 36 and sprocket wheel 34 recedes from the teeth 40 of the extension 39 when the said extension moves beyond the idler 36. At the time of such disengagement of the first car, the teeth 40 of the lateral extension of the car marked $x$ will be gradually interlocking with the sprocket chain and will have assumed the position of the car marked $y$ in the same figure. This automatic engagement of the cars will be effected with each succeeding car in the series, whereby, a continuous movement of all the cars will be had while the motor is in operation. Now as the cars progress around the track the bodies are turned by the shaft 16, this turning movement of the shaft being transmitted through the train of mechanism previously described. As the shaft 16 turns, however, the rolls 28—28 rolling on the cam surface 27 will operate to raise and lower the body, whereby a compound rotary and reciprocating movement will be imparted to the car in addition to its bodily horizontal movement around the track.

What is claimed as new is:

1. A track, a wheeled truck mounted thereon, means for moving the truck along the track, a car carried by the truck and means operatively connected with the truck wheel and car to simultaneously rotate and vertically reciprocate the car as the truck moves along the track.

2. A track, a wheeled truck mounted thereon, means for moving the truck along the track, a shaft slidably mounted on the truck, a car attached to the shaft, means for rotating the shaft from the truck wheel, a cam member mounted upon the truck and surrounding the shaft and rolls carried by the shaft and arranged to travel over the cam member as the shaft rotates.

3. An endless track, a series of wheeled trucks mounted thereon, cars carried by the trucks, flexible elements connecting the trucks together, a chain mounted for movement adjacent the track, means for moving the chain and teeth carried by the trucks and engageable with the chain.

In testimony whereof I affix my signature in presence of two witnesses.

HENRY J. MULLER.

Witnesses:
JOHN O. DONEAGH,
W. E. LAWSON.

---

Copies of this patent may be obtained for five cents each, by addressing the "Commissioner of Patents, Washington, D. C."